United States Patent [19]
Chen

[11] Patent Number: 5,794,478
[45] Date of Patent: Aug. 18, 1998

[54] TRANSMITTING CHAIN FOR AN AUTOMOBILE ELECTRIC WINDOW

[75] Inventor: Kun Chu Chen, Taipei, Taiwan

[73] Assignee: Chin-Yun Huang, Tainan Hsien, Taiwan

[21] Appl. No.: 651,821

[22] Filed: May 21, 1996

[51] Int. Cl.⁶ .................. F16H 7/02; F16H 7/18; E05F 11/48
[52] U.S. Cl. .................. 74/89.21; 49/349; 474/148; 474/205
[58] Field of Search .................. 49/349; 74/89.21; 474/148, 205

[56] References Cited

U.S. PATENT DOCUMENTS 3,313,166  4/1967  Elster .................. 474/205 X
4,767,386  8/1988  Spaggiari .................. 474/148
5,440,944  8/1995  Chen .................. 74/89.21
5,615,577  4/1997  Chen .................. 74/89.21

*Primary Examiner*—Allan D. Herrmann
*Attorney, Agent, or Firm*—Bacon & Thomas

[57] ABSTRACT

A transmitting chain for an automobile electric window includes an endless transmitting chain, a lower gear, an upper gear, two lower chain protectors, two upper chain protectors, two elastic tubes and an elongate cover. The lower chain protectors contain the lower gear having a leaf connector to combine with a rotating mechanism, which rotates the lower gear. The lower gear then moves the chain, which then rotates the upper gear. The upper gear then moves a lowering and lifting mechanism of the electric window of an automobile. The endless chain has its two intermediate portions contained in the elastic tubes and the elongate cover covers the tubes to hold them side by side.

3 Claims, 7 Drawing Sheets

5,794,478

1

TRANSMITTING CHAIN FOR AN AUTOMOBILE ELECTRIC WINDOW

BACKGROUND OF THE INVENTION

This invention concerns a transmitting chain for an automobile electric window, particularly producing no inaccurate engagement with gears caused by lengthening of a wire rope used in the chain, able to move smoothly with little noise.

A known conventional transmitting device for an automobile electric window shown in FIGS. 1 and 2 includes a rotating mechanism 10, an upper transmitting unit 11, an endless transmitting chain 12 and two elastic tubes 13, 13 combined together.

The rotating mechanism 10 includes a lower chain protector 100, a lower gear 101, and the upper transmitting unit 11 includes an upper chain protector 110, an upper gear 111. The lower gear 101 and the upper gear 111 both engage with the transmitting chain 12, which has a plurality of teeth 120 and a wire rope 121 holding the teeth 120 in equal spaced distances.

As shown in FIGS. 2 and 3, the wire rope 121 of the chain 12 will lengthen for some length after a long period of use, causing the distance between every two teeth 120 lengthened than the original distance. Then the chain can hardly engage accurately with the gears 101 and 111. And a spring S is additionally provided to overcome the lengthening of the wire rope 121. However, as shown in FIG. 4, it may work if the lengthened distance is very short. But if the lengthened distance should be long, the spring S would hardly work so that the chain cannot engage accurately with the gears 101, 111. Then, engagement of the chain with the gears becomes inaccurate, probably producing sliding of the chain off the gears and wear and tear of the chain and the gears after a long period of use. Consequently, the electric window may not be closed and opened normally, giving out noise and lessening its service life.

SUMMARY OF THE INVENTION

The present invention has been devised to offer a transmitting chain for an automobile electric window, preventing a wire rope used therein from lengthening so that the chain can always engage accurately with the gears therein, lowering noise and increasing its service life.

The main feature of the invention is an endless transmitting chain formed integral to have a plurality of teeth spaced apart equidistantly in an inner side, a flat outer side, and a wire rope wrapped between the inner side and the outer side.

BRIEF DESCRIPTION OF DRAWINGS

This invention will be better understood by reference to the accompanying drawings, wherein.

2

Figure 6:
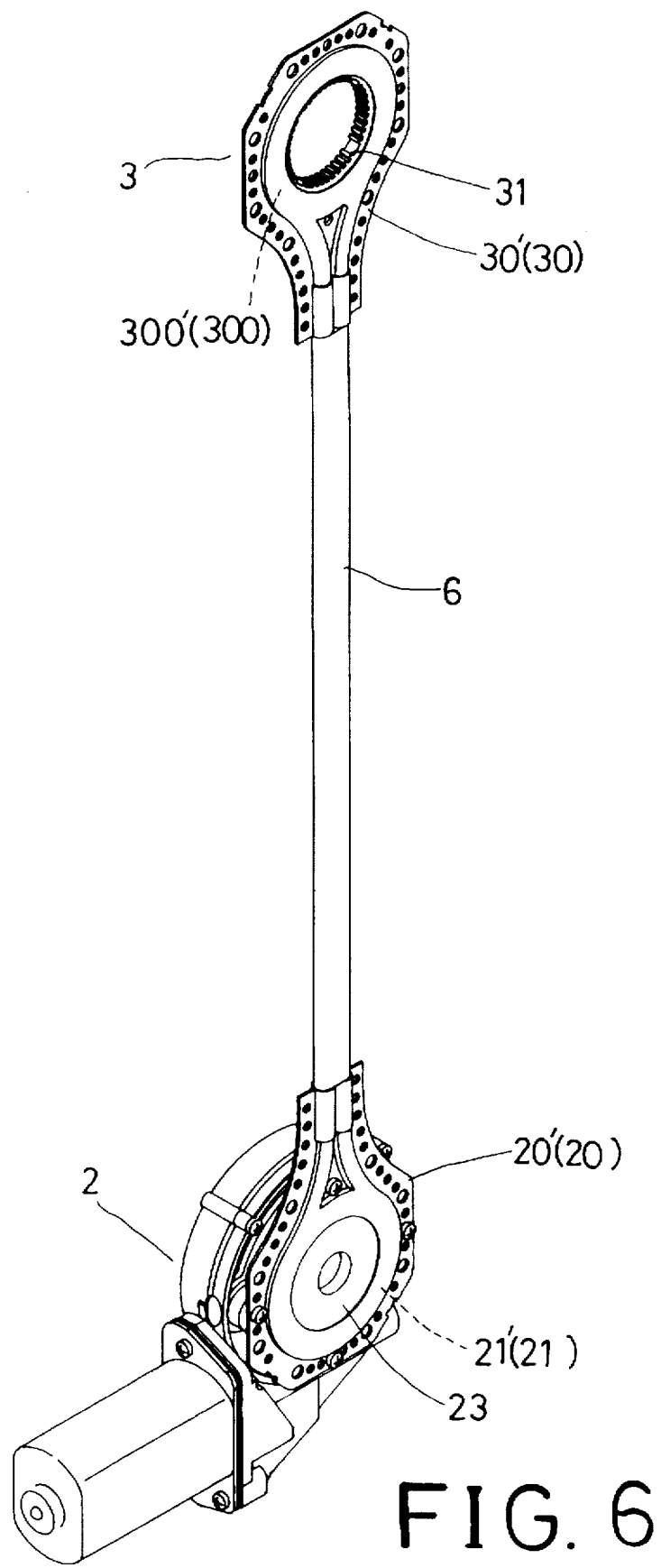
Figure 7:
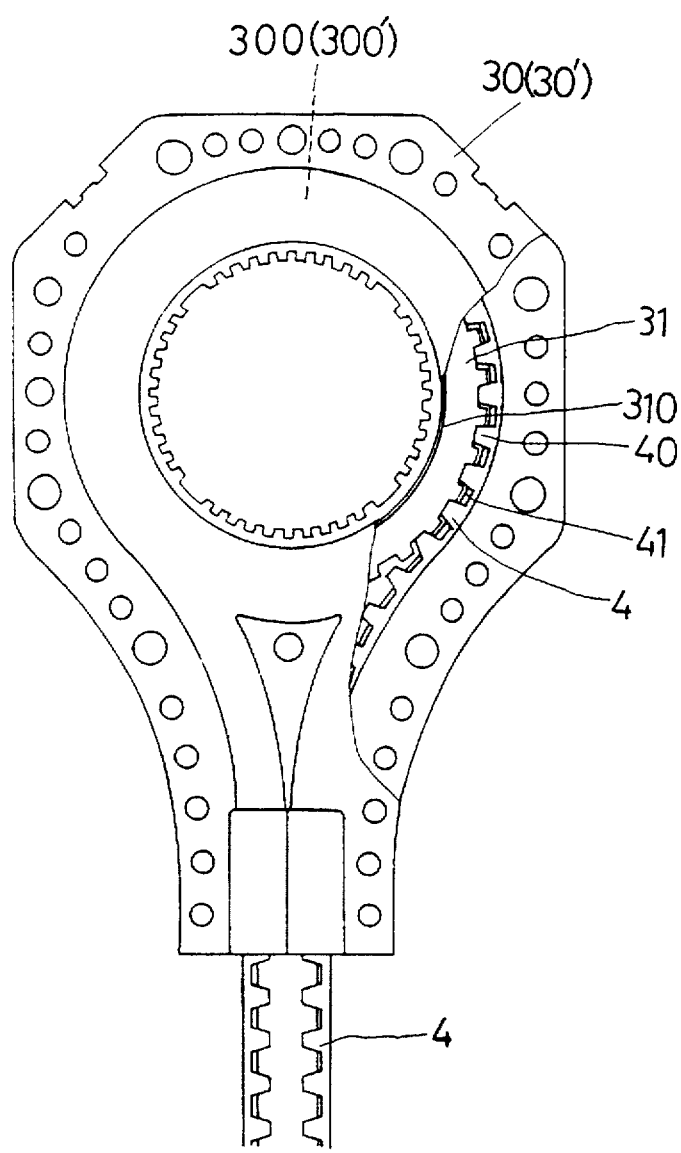
Figure 8:
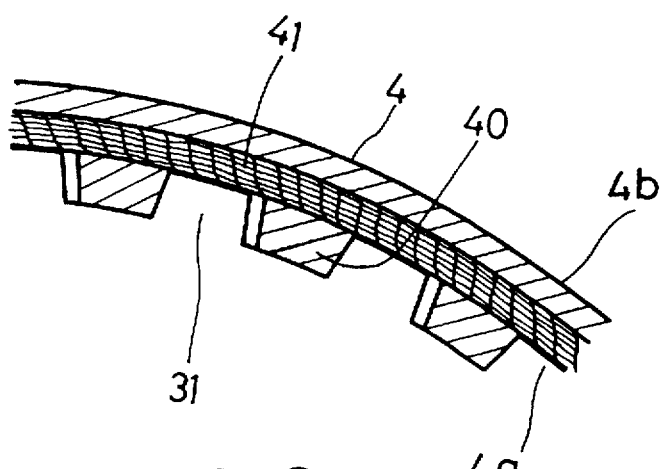

FIG. 6 is a perspective view of the transmitting chain for an automobile electric window in the present invention;

FIG. 7 is a front view of an upper transmitting unit of the transmitting chain for an automobile electric window in the present invention; and, FIG. 8 is a side partial view of the transmitting chain engaging with a gear in the present invention.

DESCRIPTION OF THE PREFERRED EMBODIMENT

Figure 1:
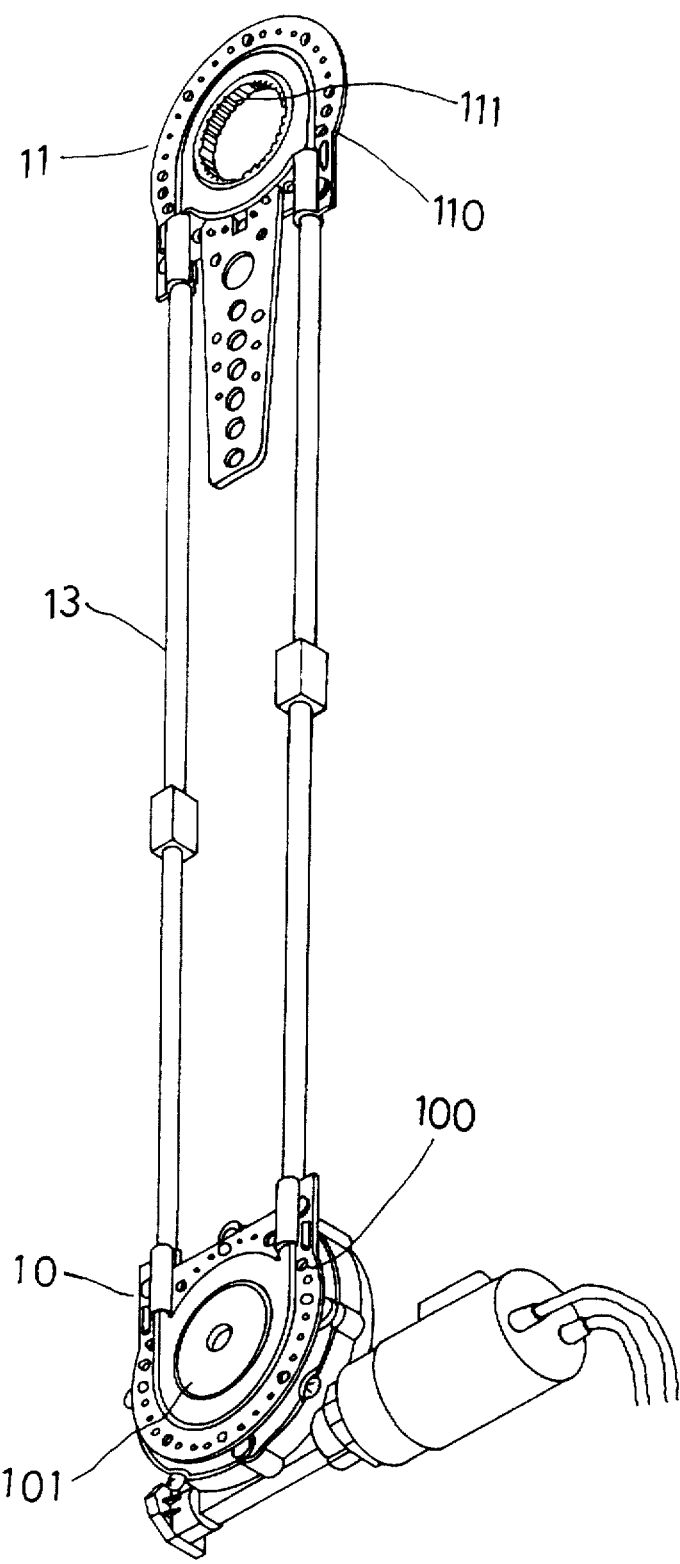
FIG. 1 is a perspective view of a known conventional transmitting device for an automobile electric window.
Figure 2:
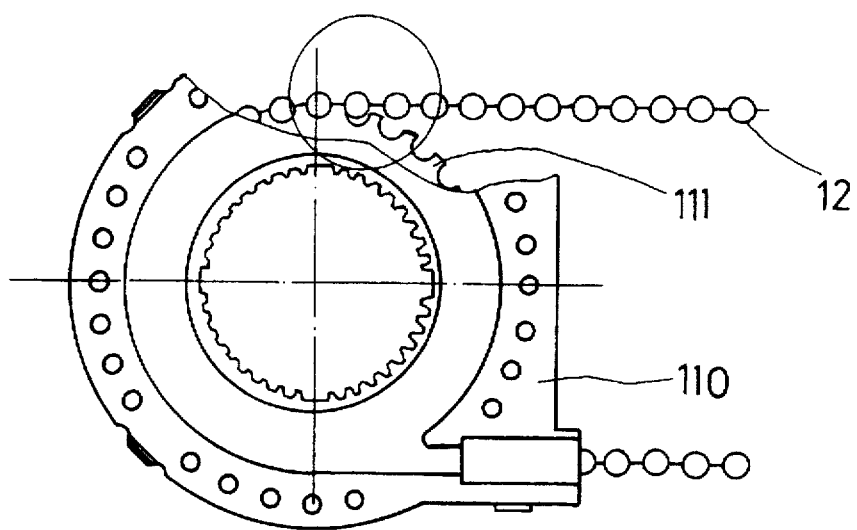
FIG. 2 is a partial cross-sectional view of the conventional transmitting device in FIG. 1.
Figure 3:
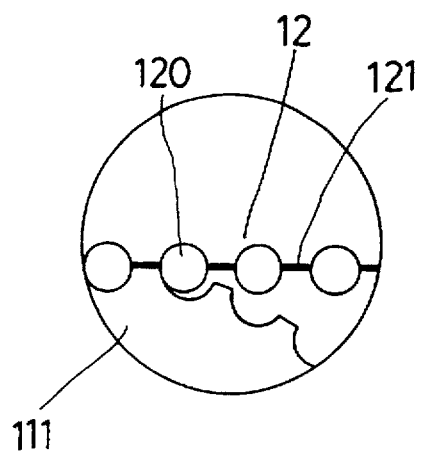
FIG. 3 is a side view of a transmitting chain engaging with a gear in the conventional transmitting device in FIG. 1.
Figure 4:
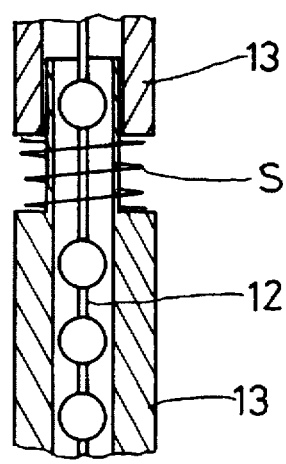
FIG. 4 is a cross-sectional view of a spring for compensation of lengthening of a wire rope in the conventional transmitting device in FIG. 1.
Figure 5:
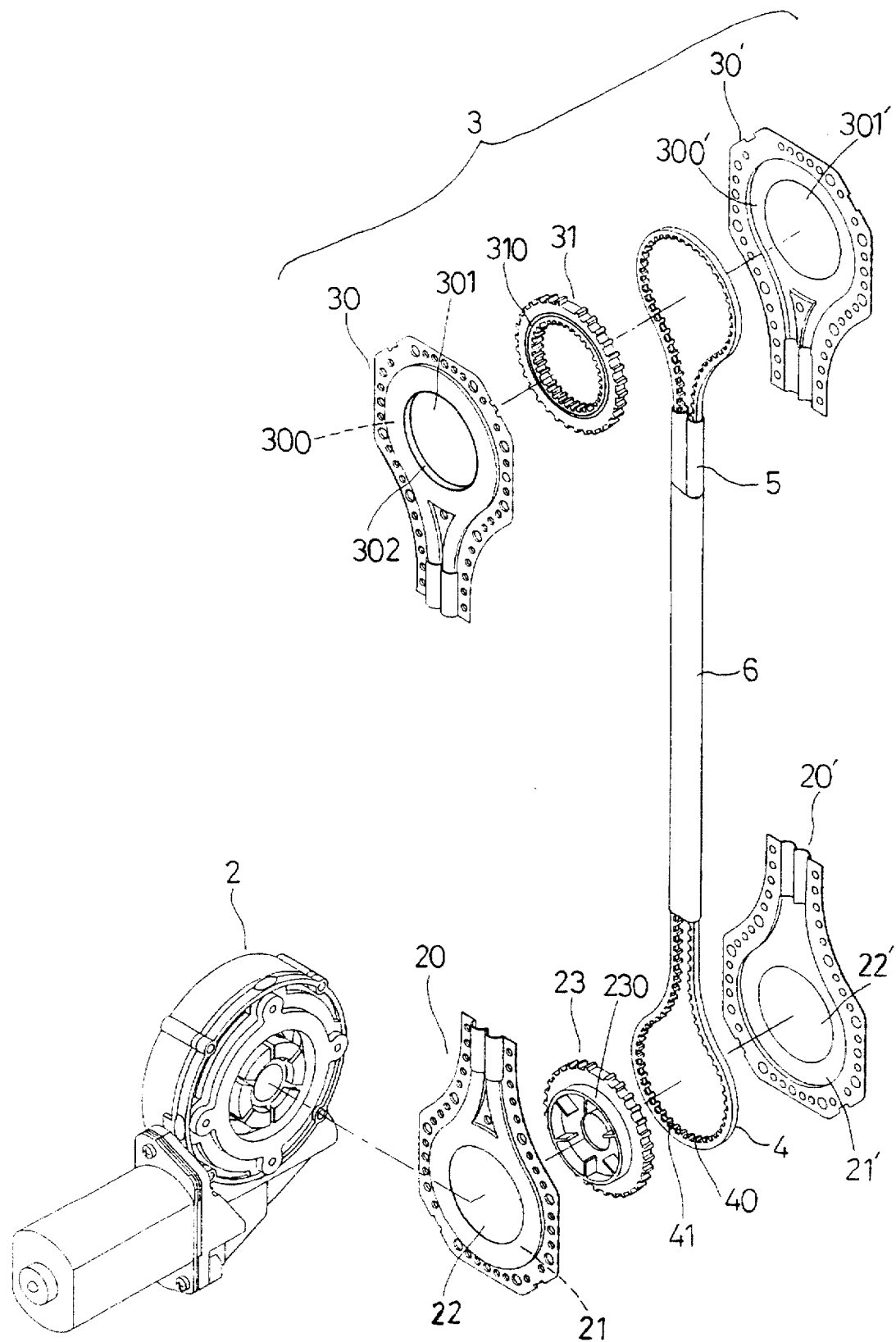
FIG. 5 is an exploded perspective view of an transmitting chain for an automobile electric window in the present invention.

A preferred embodiment of a transmitting chain for an automobile electric window, as shown in FIG. 5, includes two lower chain protectors 20, 20', a lower gear 23, an upper transmitting unit 3, and an endless transmitting chain 4, two elastic tubes 5 and an elongate cover 6.

The two lower chain protectors 20, 20' are fixed on a right side of a rotating mechanism 2, respectively formed with a recessed-shaped chain passageway 21, 21' and a center hole 22, 22'.

The gear 23 is located in the chain passageways 21, 21', having a leaf connector 230 formed on a left side for combining with and being rotated by the rotating mechanism 2.

The upper transmitting unit 3 includes two upper chain protectors 30, 30' and an upper gear 31. The two upper chain protectors 30, 30' respectively have a recessed-shaped chain passageway 300, 300' and a center hole 301, 301'. The center hole 301 of the chain protector 30 has an annular projecting sidewise edge 302. The upper gear 31 is fitted in the recessed-shaped chain passageways 300, 300', having an annular groove 310 in a right side to fit with the projecting edge 302 of the chain protector 30 so as to position the upper gear 31 in place.

The endless transmitting chain 4 movably fitted in the lower chain passageways 21, 21', 300, 300' of the lower and the upper chain protectors 20, 20', 30, 30', engaging with the gears 23 and 31 at the same time, having a plurality of teeth 40 spaced apart equidistantly on an inner side 4a but a flat outer side 4b. Then a wire rope 41 is wrapped between the inner side 4a and the outer side 4b of the chain 4.

The two elastic tubes 5, 5 contain two intermediate portions of the endless transmitting chain 4 between the lower and the upper chain protectors 20, 20', 30, 30' and are located side by side.

The elongate cover 6 covers the two elastic tubes to always hold the same side by side.

In assembling, referring to FIGS. 5 and 6, firstly, the two elastic tubes 5 are made to contain the intermediate portions of the endless chain 4 between the lower and the upper chain protectors 20, 20' and 30, 30', and then the elongate cover 6 is covered around the two elastic tubes 5, 5 to hold them side by side. Next, the gear 23 is made to engage the teeth of the lower portion of the chain 4 and then they are fitted in the lower chain passageway 21 of the lower chain protectors 20, with the lower chain protector 20' fixed with the lower chain with the leaf connector 230 of the gear 23 protruding sidewise through the center hole 22 of the lower chain protector 20. After that, the gear 31 is made to engage the teeth 40 of the upper portion of the endless chain 4 and then they are fitted in the recessed upper chain passageway 300 of the upper chain protector 30, with the annular groove 310 engaging with the protruding edge 302 of the upper chain protector 30, and then the upper chain protector 30' is fixed with the upper chain protector 30. Finally the lower chain protectors 20, 20' are screwed firmly with the rotating mechanism 2, with the leaf connector 230 fitting with a leaf connector of the rotating mechanism 2, finishing assemblage.

In using, the lower gear 23 is rotated by a motor in the rotating mechanism 2, synchronously moving the endless chain 4, which then in turn revolves the upper gear 31 in the upper chain protectors 30. 30'. Then the upper gear 31 engaging with the chain 4 will be rotated thereby, moving a lowering and lifting mechanism of the electric window of an automobile.

Because the endless transmitting chain 4 is formed integral with the wire rope 41 wrapped inside, having the plurality of teeth 40 in the inner side and the flat outer side, the chain 4 has no such drawback of inaccurate engagement of the chain with the gears caused by lengthening of the wire rope 41 as those in the conventional one, after a long period of use. In addition, engagement of the gears 23 and 31 with the chain 4 is accurate and stable, causing little noise in transmitting movement, no jumping of the chain 4 off the teeth of the gears 23 and 31, and less wear and tear of the gears and the chain.

Besides, the two elastic tubes 5, 5 are designed to be located side by side, adaptable to various styles of electric windows of automobiles, able to be bent with small difference between them when they are bent so that they may not be twisted relative to each other, letting the chain move smoothly without possibility of inaccurate engagement of the chain with the gears to cause the chain jump off the gears as the conventional one does.

As understood from the above description, this invention has advantages as follows.

1. As the wire rope is formed by integrally wraped inside the chain, it cannot lengthen by use for a long period, getting rid of subsequent inaccurate engagement of the gears with the chain.

2. The chain has the teeth in the inner side and the outer side flat so that its engagement with the gears may be extremely good, stable, causing little noise, no sliding of the chain off the gears, and few wear and tear to have a long service life.

While the preferred embodiment of the invention has been described above, it will be recognized and understood that various modifications may be made therein and the appended claims are intended to cover all such modifications, which may fall within the spirit and scope of the invention.

What is claimed is:

1. A transmitting chain for an automobile electric window, comprising:

two lower chain protectors fixed on one side of a rotating mechanism to fit with each other, each of said chain protectors having a recessed portion forming a lower chain passageway and a lower center hole, a lower gear fitted in said lower chain passageway, said gear having a leaf connector projecting sidewise into said center hole of one of said two lower chain protectors;

an upper transmitting unit having two upper chain protectors and a upper gear, said two upper chain protectors respectively each having a recessed portion forming an upper chain passageway and an upper center hole, one of said two upper chain protectors having a sidewise projecting annular edge around said upper center hole, said upper gear having an annular groove in one side;

an endless transmitting chain fitted in said lower and upper chain passageways of said lower and said upper chain protectors and engaging said lower and upper gears in said upper and lower chain protectors;

two elastic tubes enclosing intermediate portions of said transmitting chain between said upper and said lower chain protectors;

an elongate cover covering around said two elastic tubes so as to locate said two elastic tubes side by side; and, wherein said transmitting chain is integrally formed with a plurality of teeth spaced apart equidistantly on an inner side, having an outer flat side and a wire rope located between said inner side and said outer side.

2. The transmitting chain as claimed in claim 1, wherein said two elastic tubes are positioned side by side so that they bend together in the same way when they are bent, not twisting with each other thereby permitting said transmitting chain contained therein to move stably and steadily.

3. The transmitting chain as claimed in claim 2, wherein said lower and said upper chain protectors each have portions engaging said two elastic tubes.

* * * * *